United States Patent [19]

Mouche et al.

[11] Patent Number: 5,389,135
[45] Date of Patent: Feb. 14, 1995

[54] CHEMISTRY TO PREVENT THE BUILD UP OF HARD ASH DEPOSITS ON EQUIPMENT

[75] Inventors: Richard J. Mouche, Batavia, Ill.; Dana Novak, Fairbanks, Ak.

[73] Assignee: NALCO Chemical Company, Naperville, Ill.

[21] Appl. No.: 197,522

[22] Filed: Feb. 16, 1994

[51] Int. Cl.$^6$ .................. C09D 105/14; C09D 7/12
[52] U.S. Cl. .................................. 106/162; 106/708; 106/495
[58] Field of Search ................ 106/162, 708; 198/495

[56] References Cited

FOREIGN PATENT DOCUMENTS 1096245 6/1984 U.S.S.R. .............................. 106/708

Primary Examiner—David Brunsman
Attorney, Agent, or Firm—Robert A. Miller; James J. Drake

[57] ABSTRACT

The instant invention comprises a method of preventing ash deposition on equipment comprising adding a hemicellulose extract to phosphonate to form a mixture. The ratio hemicellulose extract to phosphonate in the mixture is preferably between 75 to 1 to 100 to 1. Once the mixture is formed, it is introduced to the equipment by injection into the spray water line. (Dosages of the mixture were based on the water flow). Alteratively, molasses maybe used in place of the hemicellulose extract to achieve comparable results by the instant method.

10 Claims, No Drawings

CHEMISTRY TO PREVENT THE BUILD UP OF HARD ASH DEPOSITS ON EQUIPMENT

BACKGROUND OF THE INVENTION

Field of the Invention

The invention relates to a method of preventing ash deposition on equipment by adding a hemicellulose extract/phosphonate mixture to the equipment, in order to prevent ash deposition.

Description of the Prior Art

In the United States alone, in 1980, the ash handling industry served coal burning equipment which burned 696 million tons of coal that produced approximately 66 million tons of ash. Projections for 1986 are nearly double this amount. In many industrial power plants, the use of coal as the source of energy is supplemented by oil, gas, or various forms of waste materials as the boiler fuel. Traditionally, the ash handling industry has concerned itself with transporting ashes from the furnace to intermediate or final points of disposal. The equipment has included not only the primary storage equipment for receiving the bottom ash directly from the furnace for temporary storage but also the conveying equipment for periodic or continuous removal of ash from the entire system including siftings, economizer ash, air heater ash, fly ash and mill rejects.

Apart from the traditional types of equipment, the ash handling industry's responsibility has broadened considerably over the years. In addition to handling solid products of combustion efficiently and economically, and to providing supporting services during the operating life of the equipment, an added responsibility developed at a rapid rate— that of minimizing pollution of both air and water as a result of the handling operation.

During the handling of ash, many pieces of equipment that come into contact with the ash encounter performance problems as a result of ash buildup. Specifically, machinery such as ash water mixers for ash wetting may build up to 4 to 5 inches of hardened ash on the paddles and shafts of the ash unloader after only 3 or 4 loads of ash are moved. As a result, the ash unloader must be shut down in order for the panels and shafts of the unloader to be scraped clean of the built up ash. As a result of ash buildup, the down time of such machinery is greatly increased and the expense of using the machinery is increased as well.

In addition to problems with respect to down time and efficiency, ash buildup in delicate moving parts of the machinery may result in breakdown of the machinery and shorter working life for the machinery. As a result, it is desirable to lessen the amount of hardened ash buildup that occurs on the machinery. Desirably, a compound would exist which could interact with the ash in order to soften it and allow it to be removed easily without scraping and to prevent sizable buildup over a short period of time.

Summary of the Invention

The instant invention comprises a method of preventing ash deposition on equipment comprising adding a hemicellulose extract to phosphonate to form a mixture. The ratio of hemicellulose extract to phosphonate in the mixture is preferably between 75:1 to 100:1. Once the mixture is formed, it is introduced to the equipment by injection into the spray water stream. Alternatively, molasses may be used in place of the hemicellulose extract to achieve comparable results by the instant method.

Description of the Preferred Embodiment

The invention relates to a method of preventing ash deposition on equipment. During ash handling processes, the build of deposits from numerous types of ash is a common problem.

The method of the instant application comprises the steps of adding an effective amount of either a hemicellulose extract or molasses to a phosphonate to form a mixture and introducing an effective amount of the mixture to the equipment to prevent ash deposition. Preferably, the phosphonate of the claimed method comprises a mixture of about 50% by weight methylene phosphonic acid and about 50% by weight water. The phosphonate is available as a commercial product from Nalco Chemical Company as a liquid, Nalco 1392.

The mixture is introduced to the equipment by chemical injection pump into the spray water line. Either a hemicellulose extract or molasses is added to the phosphonate to form a mixture for treating the equipment. The hemicellulose extract is available as the commercial product Temulose ® from Temple-Inland Forest Products Corp. of Diboll, Tex.

Molasses is preferably utilized at a level of from 1-8% by weight of the composition of the invention. The molasses employed is a natural by-product from cane sugar manufacture and may contain up to 20% by weight water. Molasses materials containing an excess of 20% water should be avoided because of possible hydration of other components of the invention which would result in reduced storage life. Most preferably, from 2-6% by weight molasses is utilized in the composition of the invention.

The ratio of hemicellulose extract or molasses to the amount of phosphonate added is between 75:1 to 100:1. Preferably, the amount of the hemicellulose extract or molasses mixture is added to the spray water at a rate of between 500 to 1200 parts per million by weight of the mixture. More preferably, the amount of hemicellulose extract mixture is added at between 600 to 1100 parts per million by weight of the mixture. Most preferably, the amount of hemicellulose extract or molasses mixture is added at 750 to 1000 parts per million by weight of the mixture. (Dosages based on water flow rate).

Once the hemicellulose extract or molasses/phosphonate mixture is formed, the mixture is added to the equipment by injection to the spray water line.

The following examples are presented to describe preferred embodiments and utilities of the invention and are not meant to limit the invention unless otherwise stated in the claims appended hereto.

EXAMPLE 1

Ash building up on the paddles of an ash unloader/ash wetting equipment and setting up like concrete caused problems in terms of the ability of the equipment to run continuously. After hauling only three or four loads of ash, the loader shafts and paddles would have four to five inches of hardened ash buildup so it appeared the shafts were twelve inches in diameter and the paddles were only about one inch long, when in fact the shafts should have been four inch square stock and the paddles should have been six inches long.

A hemicellulose extract is commercially available as Temulose ®, from Temple-Inland Forest Products Corp. of Diboll, Tex. and was used at dosages of 100 ppm, 400 ppm, 1500 ppm, and 3000 ppm was added to the spray water prior to the equipment.

All dosage levels failed. Subsequently, a sugar solution was added to stop the ash from setting up. Sugar dosages of 1000 ppm, 2000 ppm, 3000 ppm and 4000 ppm were tried. All failed to keep the ash soft and easy to remove. The tests were repeated using molasses at dosages of 1000 ppm, 2000 ppm, 3000 ppm and 4000 ppm, again with negative results.

A solution containing Temulose at 1000 ppm with 10 ppm of a phosphonate compound was used. The solution gave satisfactory results at a dosage of 750 ppm Temulose and 10 ppm phosphonate. The satisfactory results were that very little ash buildup occurred after ten loads of ash were hauled. The little ash that had built up was very soft and easily removed. A combination of phosphonate at 10 ppm with molasses at 1000 ppm worked equally well.

A combination of sugar with phosphonate had no satisfactory results as far as keeping the equipment clean even at high doses. It appears there is a difference between pure sugar and molasses or Temulose. The difference in maintenance between using no treatment and treatment with either molasses or Temulose with a small dose of phosphonate (10 ppm) is as follows.

Without treatment, three loads is the maximum that the equipment may be used. After the third load, the equipment needed cleaning. Cleaning required about two and one half hours to chip the ash off the blades in the ash unloader. This occurred about once every two to three days.

With treatment, 15 to 20 loads could be used before cleaning was required. Further, cleaning was improved so that only one hour was needed to scrape the blades instead of chipping the ash off the blades. Also, cleaning was only needed once every two weeks.

What is claimed is:

1. A method of preventing ash deposition on equipment, comprising:
    a) adding a hemicellulose extract to phosphonate to form a mixture, having a hemicellulose extract to phosphonate ratio between 75:1 to 100:1; and
    b) introducing an effective amount of the mixture to the equipment to prevent ash deposition.

2. The method of claim 1, wherein the amount of hemicellulose extract mixture added is from between 500 to 1200 parts per million.

3. The method of claim 2, wherein the amount of hemicellulose extract mixture added is from between 600 to 1100 parts per million.

4. The method of claim 3, wherein the amount of hemicellulose extract mixture added is from between 750 to 1000 parts per million.

5. The method of claim 1, wherein the phosphonate comprises a mixture of about 50 percent by weight methylenephosphonic acid and 50 percent by weight water.

6. A method of preventing ash deposition on equipment, comprising:
    a) adding molasses to phosphonate to form a mixture having a molasses to phosphonate ratio between 75:1 to 100:1; and
    b) introducing an effective amount of the mixture to the equipment to prevent ash deposition.

7. The method of claim 6, wherein the amount of molasses mixture added is between 500 to 1200 parts per million.

8. The method of claim 7, wherein the amount of molasses mixture added is from between 600 to 1100 parts per million.

9. The method of claim 8, wherein the amount of molasses mixture added is from between 750 to 1000 parts per million.

10. The method of claim 6, wherein the phosphonate comprises a mixture of about 50 percent by weight methylenephosphonic acid and 50 percent by weight water.

* * * * *